United States Patent [19]

Schneider

[11] 4,213,504
[45] Jul. 22, 1980

[54] ROTARY, HAND-HELD APPARATUS FOR PERFORMING VARIOUS SOIL WORKING OPERATIONS

[76] Inventor: Fred A. Schneider, 841 Mohican Way, Redwood City, Calif. 94062

[21] Appl. No.: 849,088

[22] Filed: Nov. 7, 1977

[51] Int. Cl.$^2$ .......................... A01B 1/00; A01B 33/06
[52] U.S. Cl. ........................................ 172/25; 172/41; 403/307; 403/343
[58] Field of Search ................ 172/15, 25, 41, 57–59, 172/110, 111, 125; 403/307, 343

[56] References Cited

U.S. PATENT DOCUMENTS

| | | | |
|---|---|---|---|
| 264,138 | 9/1882 | Colvin | 172/25 |
| 643,165 | 2/1900 | Schumacher | 172/25 |
| 1,064,790 | 6/1913 | Tucker | 172/25 X |
| 2,622,498 | 12/1952 | Wharton | 172/25 |
| 2,888,084 | 5/1959 | Trecker | 172/41 |
| 3,059,704 | 10/1962 | Kasatkin | 172/125 X |
| 3,129,771 | 4/1964 | Lidstone | 172/25 |

FOREIGN PATENT DOCUMENTS

| | | | |
|---|---|---|---|
| 1800229 | 5/1970 | Fed. Rep. of Germany | 172/41 |
| 160978 | 6/1933 | Switzerland | 172/25 |
| 217405 | 2/1942 | Switzerland | 172/25 |

*Primary Examiner*—Richard T. Stouffer

[57] ABSTRACT

A portable, hand-held apparatus or implement employing various interchangeable soil working assemblies, wherein the latter rotate about an axis oriented substantially normal to the soil surface, i.e., the assembly rotates in a horizontal plane parallel to the soil surface. The soil working assemblies selectively include soil engaging tine, auger, drill, etc., members which depend via integral support bases from a central guide rod. The guide rod extends along the axis of rotation of the soil working assembly, wherein the tip thereof engages the soil prior to contact therewith by the rest of the assembly. The apparatus contemplates various power source configurations, mutually interchangeable with the various soil working assemblies, dependent upon the operation to be performed, the existing soil conditions, etc. Thus the apparatus may include manual, electrical, gas, etc., power sources and may employ cultivating, mulching, weeding, boring, etc., assemblies.

16 Claims, 15 Drawing Figures

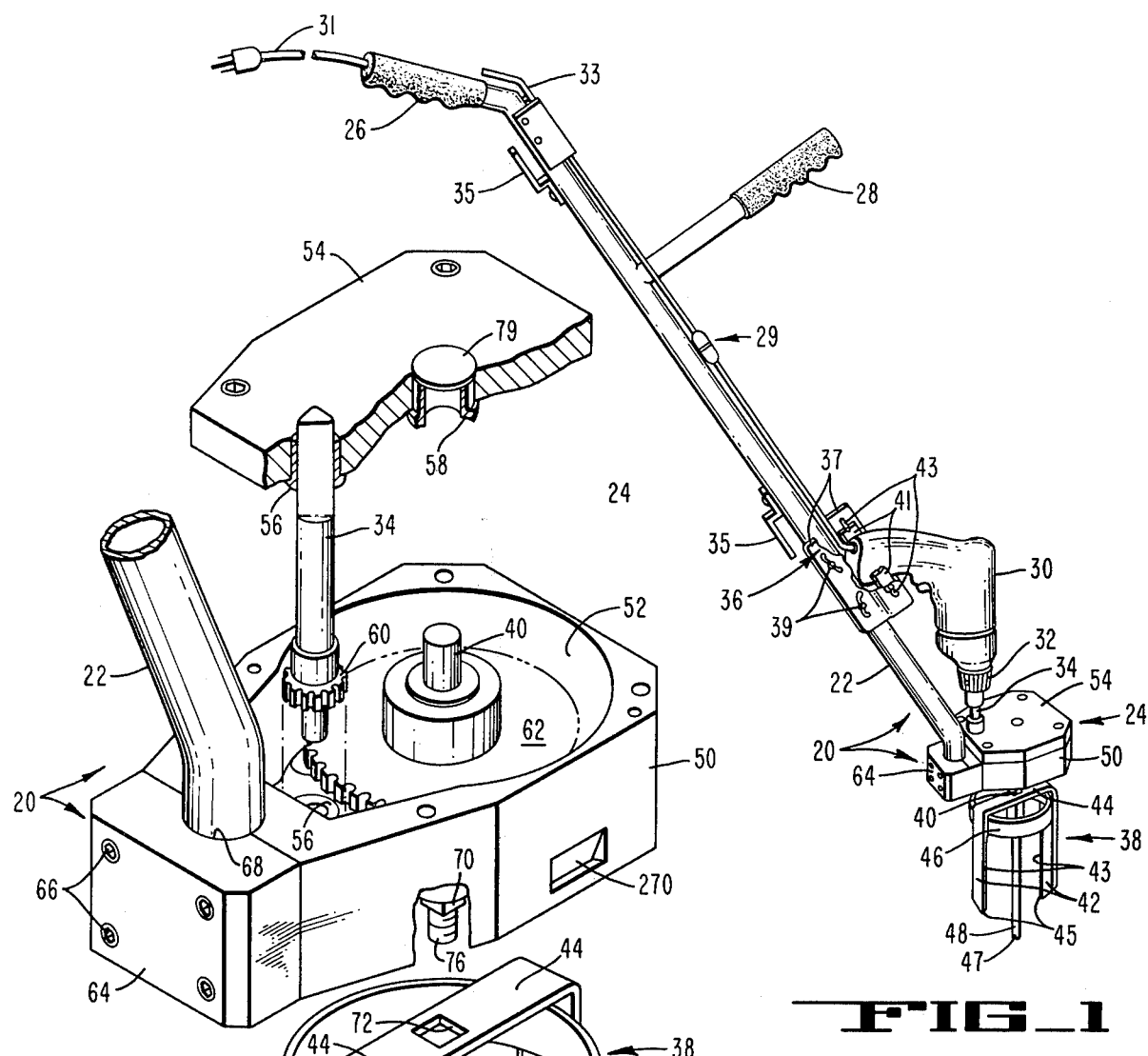
FIG_1
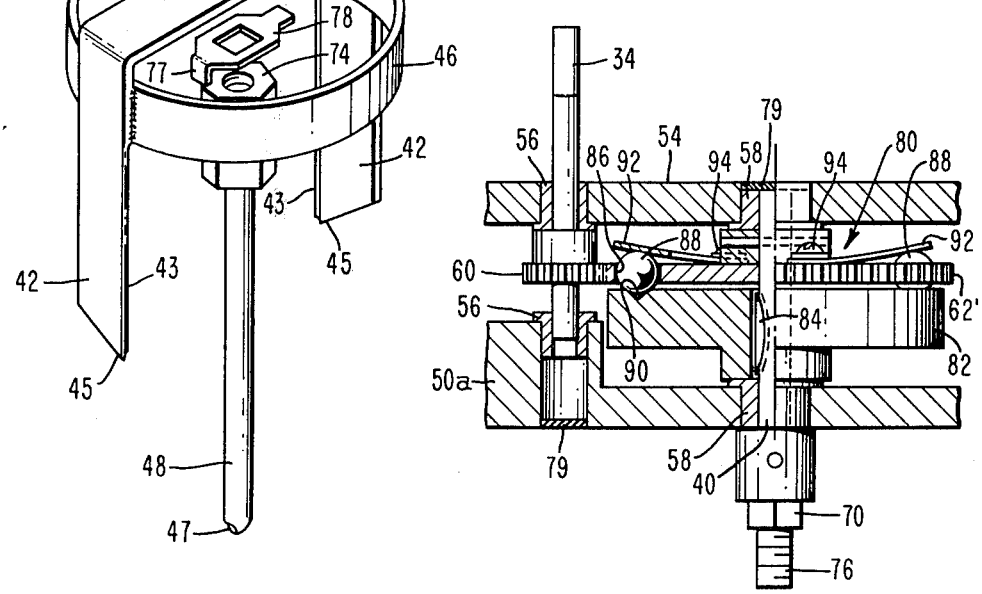
FIG_2  FIG_3

U.S. Patent  Jul. 22, 1980  Sheet 2 of 4  4,213,504
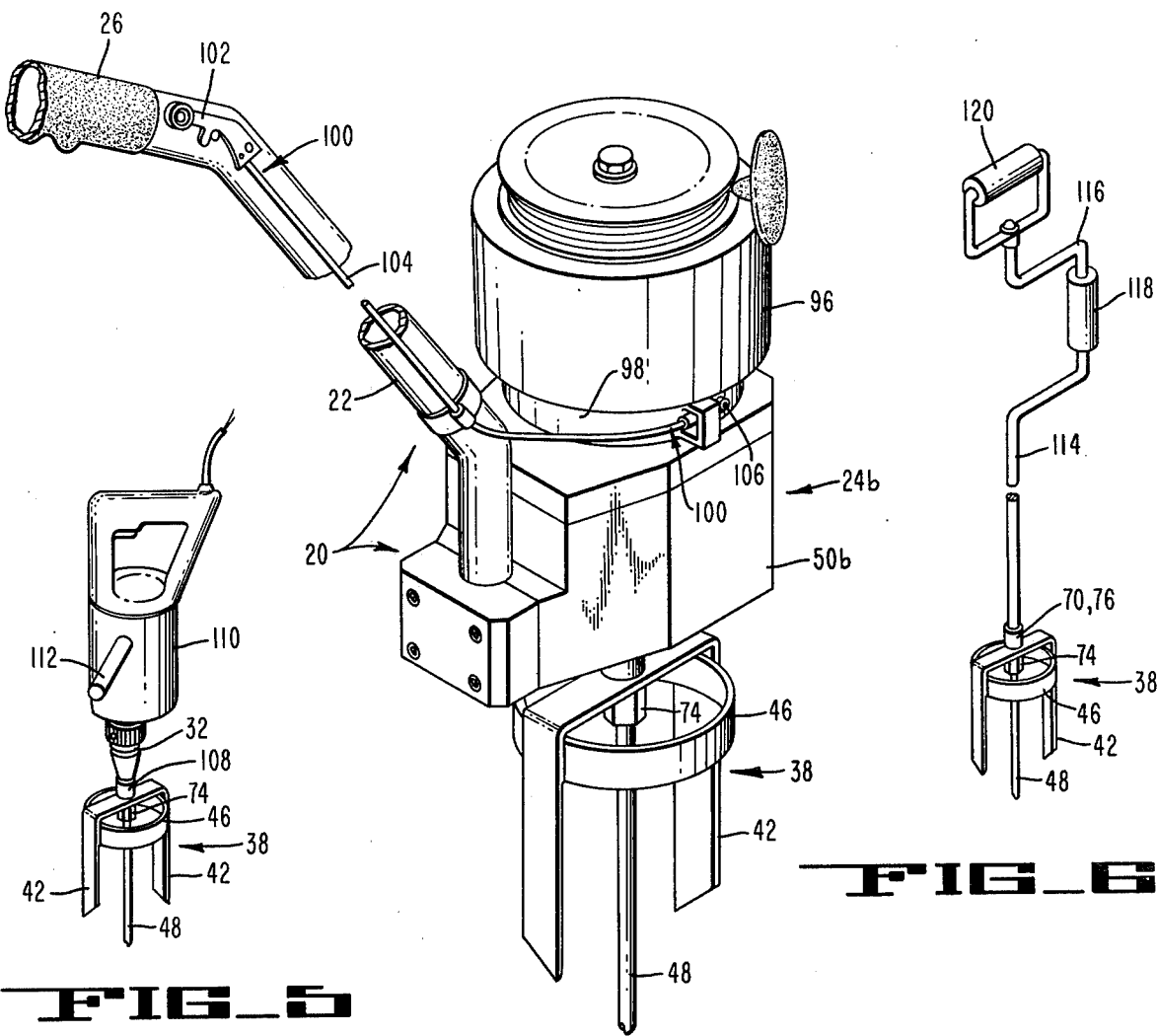
FIG_5
FIG_4
FIG_6
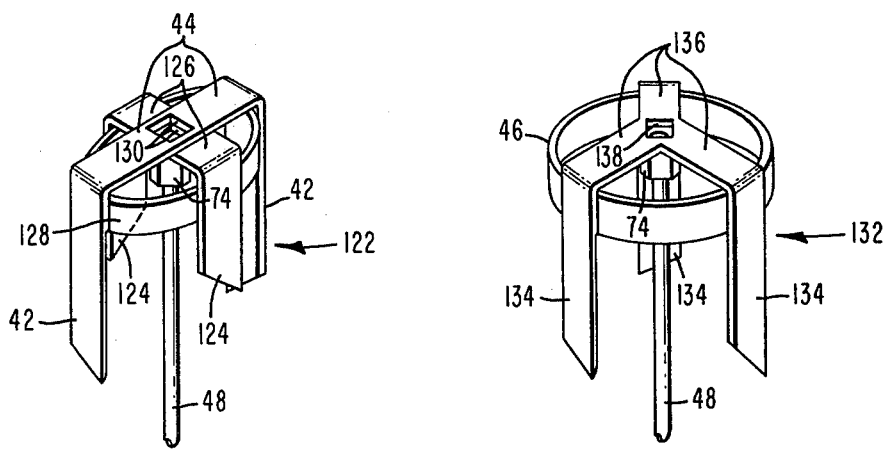
FIG_7
FIG_8

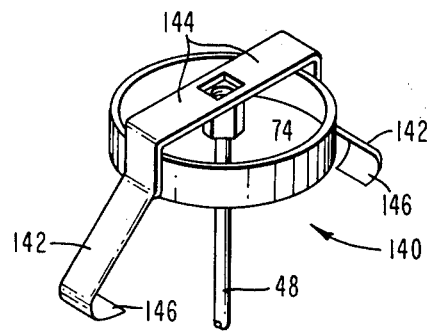
FIG_9
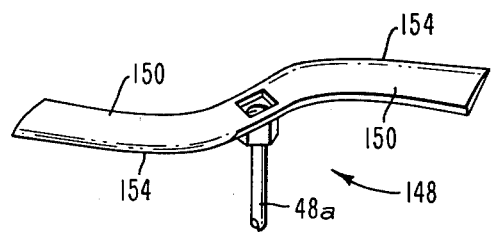
FIG_10
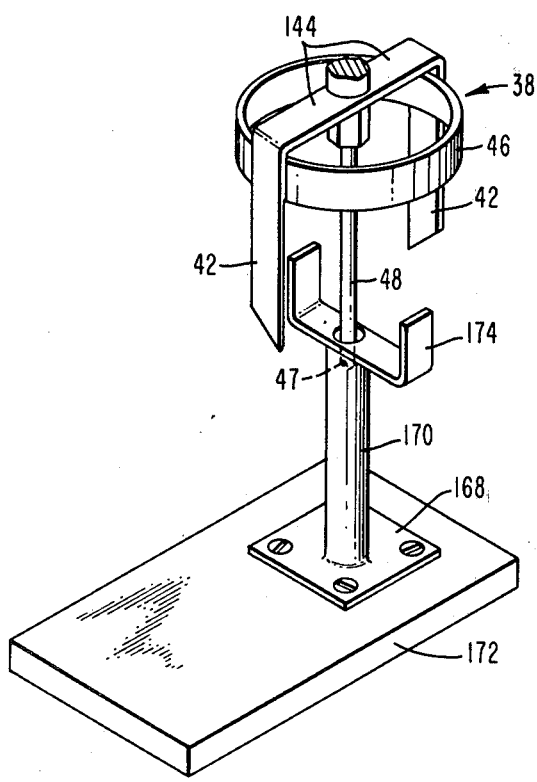
FIG_12
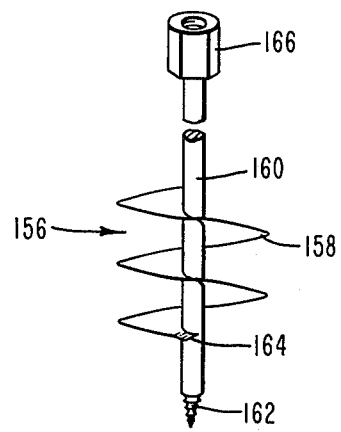
FIG_11
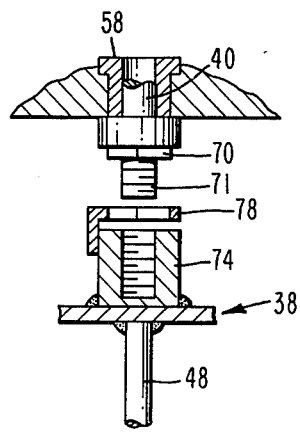
FIG_13

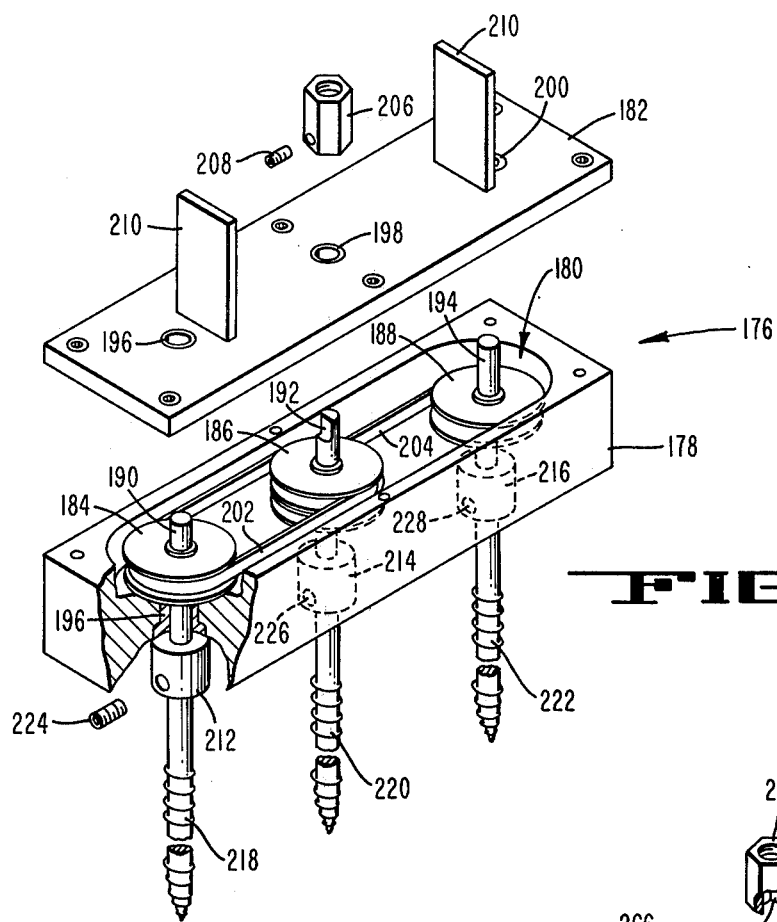
FIG_14
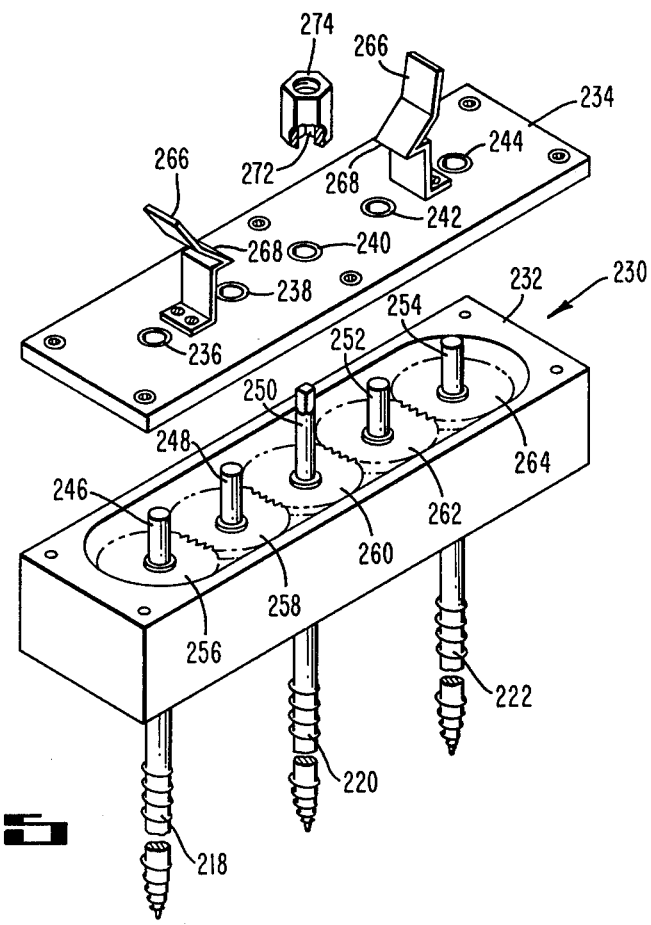
FIG_15

ROTARY, HAND-HELD APPARATUS FOR PERFORMING VARIOUS SOIL WORKING OPERATIONS

BACKGROUND OF THE INVENTION

1. Field

The invention relates to a hand-operated, portable, soil working apparatus wherein the soil engaging assembly rotates about an axis disposed substantially normal to the soil surface.

2. Prior Art

Various soil tilling implements are available for cultivating, mulching, weeding, digging holes, etc., ranging from tractor powered implements for working large farm acreages to individual manually-operated and powered hand tools, the least of which includes the shovel, hoe, post hole digger and pick. As well known to all farmers, weekend gardeners, homeowners, etc., a great deal of physical effort is required when utilizing the latter, soil working hand tools.

Accordingly, the development of light-weight, portable, hand-held soil working tools, which require less expenditure of energy by an operator while increasing his productivity, was inevitable. Typical of such individual tools are powered soil tillers such as those known by the term "rototillers", and exemplified generally by the description and drawings of U.S. Pat. Nos. 2,614,474 and 2,634,666 to C. Merry; 2,871,585 to A. Merry et al.; 3,559,743 to P. Hastings; 3,559,744 to J. Olinger; 3,734,201 to R. Zaun; 3,739,856 to C. Ray; 3,779,320 to N. Cantone; and 3,794,123 to J. Whitesides.

Such implements successfully accomplish the basic soil tilling operation, but are relatively large, rather unwieldy devices, with a plurality of radially extending tines secured to a shaft which rotates about a horizontal axis. The larger tillers may include devices mounted on a tractor for working farm acreages, or may include gas engine powered devices on wheels such as those commonly available in tool rental shops, and/or used by gardeners or homeowners for tilling garden plots, lawn areas, etc., about the average home or industrial complex. In such tillers, the large contact area of the vertically turning radial tines must be forced into the soil as they sequentially rotate against it along an arcuate path. If the soil is hard, interspersed with rocks or pebbles, is clayey, or otherwise consolidated, it is very difficult to provide sufficient force to maintain the large area tines in the soil, particularly in the case of the smaller, hand operated implements. If follows that the efficient working of only friable soil is practical unless the soil has been thoroughly watered or otherwise softened or broken-up prior to the tilling operation.

In addition, most of the above tillers discussed and exemplified in the patents are bulky and unwieldy, and are used for working generally open plots of land rather than for close tilling, cultivating or weeding in established flower beds, ground cover areas, and other planted areas. Likewise, the tillers cannot be readily used to work any plots of land, whether pre-planted or not, wherein there is any appreciable slope, and definitely are unuseable on hillsides of 15° or steeper slopes.

Recently a smaller, hand-held, wheel-less tiller has been introduced which also rotates about a horizontal axis and is designed for tilling smaller plots of land with an improved degree of versatility and portability. Such a hand-held powered tool may be used between larger plants, shrubs, trees, etc. However, since it employs the radially extending tines about a rotating, horizontal shaft, the device cannot be readily forced into any unwieldy soil by the single operator; ergo, it is primarily useful for cultivating relatively soft and yielding soil in areas where there is sufficient room for the width and diameter of the rotating tines to clear all protruding shrubbery or plants.

Another related type of soil tiller is available where the soil working tines are of various geometries, and unlike the previous prior art tillers are arranged generally vertically, for rotation about a vertically oriented axis. Typical of these devices are those which perform various soil working functions as described in U.S. Pat. Nos. 2,888,084 to F. Trecker; 1,578,769 to N. Sergeant; 2,625,867 to W. Hands, Jr.; 3,667,551, 4,029,153, 4,034,814, 4,042,041 to C. van der Lely; 3,774,688 and 3,821,989 to A. van der Lely. In the above applications, the soil working harrow or cultivator implements are primarily on wheels and/or are tractor mounted for use in tilling large acreages. The implements employ a plurality of pairs of tines, each pair rotatable about a vertical axis, wherein the combination is adapted via a tractor mounted frame to cultivate or work a swath of soil with one pass of the tractor. The rotating pairs of soil working tines are forced into and maintained within the soil by the weight of the tractor and implement and the structural rigidity of the implement frame.

The concepts of the above tillers wherein the soil working members rotate about a vertical axis, have been further adapted to hand-held, powered, soil working implements as described in U.S. Pat. Nos. 2,888,084 to F. Trecker and 4,003,436 to P. Foster et al. The hand-held device of 2,888,084 is used for light tilling of small plots of land, but must utilize a dragging vertical fin to control the rotating tines while working across the soil surface. The device of 4,003,436 employs two pair of vertical tine structures which are purposely powered for opposed oscillation about respective vertical axes, not for continuous rotation thereabout. The tine pairs are oscillated in opposed directions via a complicated linkage/cam drive train in order to prevent the implement from "walking" over the surface of any but the softest soil. The hand-held versions of U.S. Pat. Nos. 2,888,084 and 4,003,436 employing rotating or oscillating tines, cannot be forced into or maintained in soft or hard soil by a single operator, if only a single pair of tines are employed or if no adjunct dragging fin is used. Even when using opposing pairs of tines and/or adjunct dragging vertical fins, such tillers still tend to "walk" across the surface of the soil.

SUMMARY OF THE INVENTION

The invention provides a portable, rotary, hand-held soil working tiller, cultivator, and hoe implement which circumvents all the shortcomings of the prior art devices of the hand-held type. To this end, the basic embodiment of the invention employs a pair of spaced-apart tines coupled to a shaft for rotation about an axis substantially normal to the soil surface, wherein a central guide rod coaxial with the shaft extends beyond the tips of the tines to provide initial contact with the soil. The guide rod prevents any tendency for the soil working assembly to "walk" across the soil surface regardless of how hard or rocky the soil is or how steep the slope of the soil surface may be. The soil working function is not performed by forcing the apparatus into the soil as in all the prior art devices of previous mention, but by locating the area to be worked by engaging the soil with the guide rod and then urging the soil working assembly into the ground the depth desired. Thus the device is capable of working the soil deeper than prior art tillers with less effort. Basically, the device includes a support frame for operator manipulation and a power source secured to the frame and dispose to rotatably drive the shaft and thus the soil working assembly in any attitude, be it vertical, horizontal or some intermediate angle. The device includes several readily interchangeable soil working assemblies, each capable of performing a specific function and including a form of assembly guide means or modification thereof to prevent the assembly from "walking", while enhancing penetration of the soil working assembly into the soil.

In one variation of the invention combination, a simplified, inexpensive, manually-operated embodiment is useful for performing light cultivation, weeding or hole digging, as, for example, in a bed of flowers, around trees, etc., wherein the guide rod and the overall soil working assembly is urged into the soil by simultaneously pushing and rotating the device.

BRIEF DESCRIPTION OF THE DRAWINGS

FIG. 1 is a perspective exemplifying one embodiment of the rotary hand-held soil working apparatus of the invention combination.

FIG. 2 is an exploded perspective showing further construction details of the apparatus of FIG. 1.

FIG. 3 is a cross-section of a portion of apparatus such as that of FIGS. 1, 2 showing clutch means as employed therewith.

FIGS. 4, 5 and 6 are perspectives of alternative power source configurations of the invention combination; FIG. 4 employs an integral gas engine; FIG. 5 employs a very slow speed hand drill which defines its own support frame structure; FIG. 6 depicts a manually-powered soil working apparatus.

FIGS. 7–11, 14 and 15 are perspectives of alternative soil working assemblies for performing respective soil working functions as employed in integral combination with the power devices of FIGS. 1–6.

FIG. 12 is a perspective of an adjunct device used with the soil working apparatus for facilitating the removal of roots, stones or other trash during operation thereof.

FIG. 13 is a partial cross section of a modified threaded means for demountably securing the soil working assemblies.

DESCRIPTION OF THE PREFERRED EMBODIMENTS

Referring to FIG. 1, there is exemplified one embodiment of a hand-held soil working apparatus formed of support frame means 20 including a handle 22 secured to drive train means 24. Handle 22 includes a pair of grips 26, 28 with grip 26 formed of the end of the handle 22 bent at an angle, and grip 28 formed of a short length secured at right angles to the handle 22 a short distance down from the grip 26. An electric drill 30 is secured in position adjacent the handle 22 via clamp means 36, with the drill chuck 32 tightened on an input shaft 34 of the drive train means 24. The cord from drill 30 is plugged into a short length of cord from an on/off switch 33 (as at numeral 29) and an electrical input to the switch is made via input plug 31 and a suitable electric extension cord (not shown). Any extra cord may be stored by wrapping it upon brackets 35 on handle 22.

The clamp means 36 includes a pair of metal members 37 secured via bolts/wing nuts 39 to the handle 22. Rubber pads 41 are glued to the members 37 at either side of the grip of the electric drill 30 to confine same therebetween upon tightening of a second pair of bolts/wing nuts 43. Obviously, other means may be used for demountably securing the drill grip to the handle 22.

A soil working assembly 38 is demountably secured to an output shaft 40 of the gear train means 24 for rotation therewith. The soil working assembly 38 may comprise any of several configurations (see below FIGS. 7–11, 13–15) depending upon the type of soil working operation to be performed. In FIG. 1, the basic soil working assembly is shown, comprising a tine-/guide rod assembly, wherein a length of flat steel is bent in a generally "U" shape to provide a pair of substantially parallel tines 42 depending from an integral tine support base 44 formed of the same material. A bracing ring 46 is welded circumjacently within the tines 42 and against the tine support base 44 to provide reinforcing for the tines 42 to prevent their being twisted due to the forces applied thereto as they rotate in the soil. A guide rod 48 is demountably secured, as by threaded means further described below, to the output shaft 40 whereby the tine member formed by tines 42 and support base 44 also is secured to the output shaft 40. The guide rod 48 extends a selected distance beyond tips 45 of the tines 42 so as to engage the soil prior to the tines. This prevents the soil working assembly from "walking" across the soil surface regardless of its hardness, the angle at which the soil assembly enters the soil, etc. The tines 42 are preferably sharpened along the leading, i.e., cutting edges 43 thereof. To further improve penetration, the tips 45 are preferably cut, or otherwise formed at an angle, with the points of the tips at the cutting edges 43 of the tines. Likewise, a tip 47 of the guide rod 48 is beveled to provide a cutting edge for improving penetration.

The latter features are shown more distinctly in the perspective of FIG. 2 which likewise shows further details of the drive train means 24 and of the threaded means for demountably securing the soil working assembly 38. The drive train means 24 includes a gear housing 50 machined to provide a gear receiving cavity 52 and having a cover 54 demountably bolted thereto to seal off cavity 52. The cover 54 and the opposing wall of the housing 50 are drilled to provide opposing holes therein to receive pairs of bearings or bushings 56, 58 respectively. A drive gear 60 is keyed or otherwise secured to the input shaft 34, which in turn is rotatably mounted at either end thereof within the bushings 56. A driven gear 62 is keyed or otherwise secured to the output shaft 40, which in turn is rotatably mounted at either end within the bushings 58, with the teeth of gear 60 meshing with those of gear 62.

The preferred speed of rotation for the soil working assembly 38 is of the order of from 100–400 revolutions per minute (rpm). The average hand drill 30 rotates on the order of 1,000 rpm. Accordingly, by way of example only, the gears 60, 62 are selected to provide a 5-to 1 gear ratio, thus providing a soil working assembly 38 with a rotational speed of the order of 200 rpm. Obviously, other gear combinations and speeds may be utilized.

The housing 50 includes a clamp plate 64 secured thereto via bolts 66, with a bore 68 formed between the plate and the corresponding portion of the housing of a diameter slightly less than that of the handle 22. The latter is placed within the bore 68, and bolts 66 are tightened to confine the end of the handle within the bore 68. The combination handle and housing define the aforementioned frame means 20 by which the basic implement of FIGS. 1, 2 is manipulated by an operator, generally from a standing position.

The soil working assembly 38 is readily removed for sharpening, etc., or replacement with a different type of assembly, while providing a positive coupling to the output shaft 50, by providing a squared shank 70 near the end of the shaft 40, and cutting threads 76 along the end of the shaft. The squared shank 70 mates with a square hole 72 cut or punched into the tine support base 44 along the axis of the assembly 38. An internally threaded hub 74 is coaxially secured to the guide rod 48 as by welding, whereby the tines 42/base 44/bracing ring 46 unit is secured to the output shaft 40 by slipping the hole 72 in base 44 over the squared shank 70, and securing the unit to the output shaft 40 by tightening the threaded hub 74 onto the threads 76. A keeper washer 78 is placed therebetween, whereby a tip 77 thereof is bent over against a suitably squared outside surface of the hub to prevent the guide rod 48 from loosening. A rubber seal 79 is pressed over the bushing 58 in cover 54, and also over the bushing 56 in the opposing side wall of the housing 50 (FIG. 3) to seal the ends of shafts 40, 34 and thus the cavity 52.

Most hand drills rotate in a clockwise direction, thereby causing output shaft 40 to rotate in a counterclockwise direction. To prevent the tine assembly 38 from un-threading itseld during operation, in this particular embodiment left hand threads are used in the threaded end 76 and hub 74. Either left or right hand threads may be used, depending upon the direction of rotation of the soil working assembly being employed.

Although the tines 42 are shown formed of a length of flat steel, other material shapes may be employed wherein the tine cross-sections may be circular, oval, square, etc. Likewise, a single tine 42 may be used, depending from one side only of the guide rod, whereby the tine rotates alone about the latter.

Referring further to FIG. 3, wherein like components of FIGS. 1, 2 employ like numerals, there is shown a modification of the apparatus, wherein a torque release clutch means 80 is disposed between the input and output shafts 34, 40 to absorb the sudden torque which is imparted to the handle in the event the soil working assembly 38 suddenly stops due to binding with rocks, tree roots, pipes, or other like obstacles underground. Although a specific torque release clutch configuration is herein shown by way of example, it is to be understood that other configurations may be employed as long as they are sufficiently compact and capable of transmitting the necessary torque while providing slippage in the event the soil working assembly suddenly stops due to binding.

The clutch means 80 includes a modified housing 50a, wherein a clutch plate 82 is fixed to output shaft 40 via key 84, immediately adjacent a modified gear 62', which is rotatably disposed with respect to shaft 40. The gear 62' and the clutch plate 82 are confined between the housing cover 54 and the opposing wall of housing 50a via bearings 58, such that there is no axial movement therebetween. Gear 62' is modified to include two or more holes 86 evenly spaced about a circumference thereof for receiving therein respective detent balls 88. A like plurality of detent holes 90, evenly spaced in register with respective balls 88, are formed in the facing surface of the clutch plate 82. Respective flat springs 92 and secured at one end thereof as by screws 94 with the other ends thereof extending over respective detent balls 88 to confine same in holes 86 while providing sufficient force to maintain the balls within the detent holes 90, thereby locking gear 62' to the clutch plate 82. Thus in normal operation, torque generated via the drill 30 on input shaft 34 is transmitted to the soil working assembly 38 via gear 60, gear 62', clutch plate 82 and output shaft 40.

However, at such time as the assembly 38 binds against an obstacle, the force of the springs 92 against the balls 88 is overcome, and gear 62' rotates with respect to the clutch plate 82, allowing the assembly to stop rotating without imparting a sudden and dangerous torque to the handle 22 and operator. Withdrawal of the soil working assembly from the obstacle, or release of the on/off switch 33 allows the clutch mechanism to re-engage, whereby subsequent soil working under normal conditions may continue.

Referring to FIG. 4, an alternative embodiment of the invention is shown, wherein the readily demountable electric drill 30 is replaced by a gas engine 96 integral with a housing 50b generally similar to the housing 50a of FIG. 3. Ergo, housing 50b may include clutch means such as means 80 of FIG. 3 for allowing slippage in case the soil working assembly 38 binds, while further including a drive clutch means 98 for engaging and disengaging power to the assembly 38, in response to operator control. The electric on/off switch 33 and the electric cords 29, 31 on handle 22 are also replaced with a clutch control linkage, generally designated by numeral 100, which extends along the handle 22 for manipulation by the operator at the grip 26. By way of example only, the linkage 100 may include a finger operated lever 102 pivotally secured to the upper handle 22, and coupled to a control cable 104 which extends the length of handle 22. The lower end of the cable 104 is coupled to a suitable clutch lever 106 which is generally pivotally disposed through the clutch housing, whereby release of the lever 102 engages the clutch means 98. Conversely, the clutch means 98 is disengaged when the lever 102 is pivoted upwardly to the lock position. The clutch means 98 may be integral with the engine 96, whereby the clutch output shaft is coupled to the drive train means 24b of housing 50b, or the clutch means 98 may be integral with the drive train means 24b and the associated housing 50b. The engine 96 may be integral with the housing 50b with clutch means 98 coupled therebetween, whereby the entire power source is disposed within a single housing. The clutch means 98 may be of the type known as drive clutches operable via a pivotal fork or other clutch lever (106) capable of engaging and disengaging such a clutch mechanism.

The embodiment of FIG. 4 may employ a relatively larger horsepower engine and a correspondingly larger soil working assembly 38, whereby the combination is useful for relatively heavier duty cultivating, spading and hole digging, over relatively larger areas and/or in more difficult soil conditions. Furthermore, since a gas engine of the type generally employed with hand-held apparatus such as that of FIG. 4 generates a much higher rpm than does the electric drill of FIG. 1, the drive train means 24b requires a larger step down gear ratio, and accordingly a larger plurality of gears to provide the soil working assembly rotation speed of the order of 100–400 rpm of previous mention.

FIG. 5 illustrates a simplified version of the invention combination, wherein the drive train means and associated housing are omitted and the soil working assembly 38 is attached directly to a slow speed electric drill 110 via an adapter shaft 108. Adapter shaft 108 has a configuration essentially similar to the output shaft 40, the square shank 70 and threaded end 76 shown, for example, in FIGS. 2 and 3, whereby the soil working assembly 38 may be similar to that of previous mentioned and is readily interchangeable via the adapter 108 with the soil working assemblies of description hereinbelow. To be effective and practical, the drill should rotate on the order of 400 rpm or less, and should include at least one side handle 112 to allow the operator to control the apparatus and to withstand the torque generated by rotation of the soil working assembly 38 in the soil without undue discomfort. In such an embodiment, the electric drill 110 defines the support frame means 20 of the previous figures. Such a device is useful primarily for light weeding and cultivating of smaller areas as in flower, shrub, etc., beds, or boxes. Note that the electric drill rotates clockwise, thus tips 45 and cutting edges 43 are opposite to those of FIGS. 1–4.

FIG. 6 depicts still another embodiment of the invention, wherein the power source is manually supplied by the operator. To such end, an elongated rod 114 has secured to the lower end thereof, as by welding, a squared shank 70 and threaded end 76 similar to that of the adapter 108 of FIG. 5, whereby rod 114 may be readily threaded onto any of the additional soil working assemblies of FIGS. 7–11, 13–15. Rod 114 is bent to define an off-axis handle 116, and a rotatable grip 118 is formed or secured thereabout. A swivel grip 120 is rotatably secured to the end of rod 114, whereby an operator may direct and hold the device via grips 118, 120 while rotating the grip 118 about the axis of the rod 114 to thus rotate the attached soil working assembly 38 in the soil. As in FIG. 5, the manually operated apparatus of FIG. 6 is ideal for performing ligh cultivation and weeding in smaller areas such as flower beds wherein precise cultivation near existing plants is desired. Note that threaded extension lengths of rod may be employed if additional rod length is desired.

FIGS. 7–11, 13–15 depict alternate soil working assembly configurations, each of which performs a particular soil working operation, or some variation thereof. Thus in FIG. 7, the basic pair of tines 42 of an alternative soil working assembly 122 are supplemented with a second pair of tines 124 evenly spaced from tines 42. Tines 124 are of the same general shape and cross-section as tines 42 and may be of the same length, or shorter length (as shown) as the tines 42. Likewise, the tine support base 126 of tines 124 may be equal in length to the tine support base 44 of tines 42, but preferably is shorter, as shown, whereby tines 124 describe a circle of smaller radius than that described by tines 42. The addition of a second set of tines of lesser radius provides a finer soil mulching or cultivation operation. A bracing ring 128 is secured as by welding within the pairs of tines 42, 124, and is substantially of oval shape to fit within the different lengths of the support bases 44, 126. Both of the tine bases are provided with square mounting holes as at 130, whereby the soil working assembly 122 may be demountably threaded to the output shaft of any of the power sources of FIGS. 1–6 via a left hand thread means similar to that of FIGS. 2, 3.

FIG. 8 depicts another soil working assembly 132 wherein three tines 134 depend from integral tine support base 136 for substantially the same, or different, lengths and are substantially spaced 120° apart. Although each fork of the support base 136 is herein shown the same length, they may be consecutively longer whereby each tine 134 describes a circular path of different radius to provide a finer cultivating effect as the soil working apparatus 132 rotates. The assembly includes a bracing ring 46 similar to that previously described, which is welded within the tines 134 to provide reinforcing. A square hole 138 is formed at the junction of the tine support base 136 coaxial with the guide rod 48, whereby the assembly may be secured to a selected power source configuration via threaded means formed at the upper end of the guide rod 48, i.e., the internally threaded hub 74 of previous mention.

FIG. 9 depicts a soil working assembly 140 generally similar in configuration to the previous assemblies, but wherein tines 142 depend from their integral tine support base 144 at some inward or outward angle with respect to the centrally extending guide rod 48. That is, the tines 142 are not parallel with the guide rod 48. In FIG. 9, tines 142 diverge outwardly from the guide rod 48 along most of their length, and then are bent to turn inwardly to define an additional soil working portion 146. The latter may be inwardly converging with respect to the guide rod 48 and, in fact, may approach a perpendicular configuration with respect to the rod 48. The portions 146 furthermore may be slightly twisted to provide a pitch thereto which tends to draw the assembly 140 into the soil. Obviously other modifications to the configuration of the soil working assembly 140, and to the specific geometric configuration of the tines thereof, may be made to provide a specific soil working function.

FIG. 10 depicts a weed-hoeing soil working assembly 148 employing a relatively short guide rod 48a. Tines 150 are formed of a singe length of flat metal which has a squared hole formed centrally therein, whereby the assembly 148 is threadably secured to the output shaft of a power source configuration by means of an internally threaded (left hand) hub 152 which is welded to the upper end of the guide rod 48a. Hub 152 is similar to hub 74, and hoeing tine assembly 148 is interchangeable with the other tine assemblies described herein. The tines 150 are herein shown with an arcuate swept-back shape to provide a more efficient slicing effect as they enter the soil. However, the tines 150 may be straight and diametrically opposed, or straight with a swept-back configuration, etc. The tines 150 are sharpened along their leading, i.e., cutting edges 154 to provide further cutting efficiency. In addition, the tines 150 may lie flat with the horizontal, but preferably have a slight twist which tends to draw the assembly 148 into the soil. Rotation of the assembly under the soil surface provides an efficient weed hoeing device for cutting off weeds at their root level below the surface.

FIG. 11 depicts an alternate soil assembly 156 in the form of a soil-boring auger 158 formed of a continuous cylindrical or tapered screw conveyor welded about a central guide rod 160. The lower end 162 of guide rod 160 has a tapered screw thread and the lower end of the screw conveyor has a sharpened cutting edge 164 to aid in penetrating the soil during boring. The upper end of the guide rod 160 is provided with an integral, internally threaded hub 166 similar to hub 74 whereby the assembly 156 may be interchanged with the other assemblies. It may be seen that the conveyor essentially comprises a continuous "tine" or vane which is coupled to the central guide rod 160. Note that additional lengths of rod may be provided by threaded means (not shown) to extend the depth to which the assembly 156 can bore.

FIG. 12 depicts an adjunct device for use with the soil working assemblies exemplified in FIGS. 1-9, and provides more particularly a simple means for readily removing trash, roots, rocks, etc., from between the tines of the soil working assembly. To this end, a metal base 168 is secured to a pipe 170, and is bolted to a length of board 172 whereby an operator may place one foot on the board to secure the device during use. A U-shape fork 174 is welded to the upper end of pipe 170 and a hole is drilled therethrough in register with the hole of the pipe 170. The length of the pipe 170 and the vertical length of the fork 174 are selected such that a soil working assembly 38, and particularly the tine support base thereof, clears the upwardly extending ends of the fork 174 when the tip 47 of the guide rod 48 bears against the base 168. Thus when the soil working assembly is tangled in roots, trash, etc., the guide rod 48 is inserted into the hole in the pipe 170 until the tip bears against the base 168, whereby continued rotation of the soil working assembly causes the fork 174 to clear all trash from the assembly.

FIG. 13 illustrates an alternate threaded means for the assembly configuration and for its attachment to a power source. Output shaft 40 extends through bushing 58 to terminate in a square shank 70' and threads 76. Shank 70' is only wide enough to receive the keeper washer 78. The hub 74/guide rod 48 is secured to the tine support base 44 of the tine member by welding the hub 74 to the top of the support base 44 with the guide rod 48 extending through a hole therein. This unitary configuration may be used with any of the soil working assemblies of FIGS. 1-11.

FIGS. 14 and 15 depict still other soil working assemblies 176, 230 respectively, which are used to bore holes into overly compacted soil, such as commonly found in older lawns, banks of ground cover, root areas around older trees, etc. Such an operation is performed to aerate the soil and improve its ability to absorb water more deeply. To this end, a pulley housing 178 is machined to provide a cavity 180, and is provided with a cover 182 suitably bolted thereto to seal off the cavity 180. A plurality of selectively spaced pulleys 184, 186 and 188 are rotatably disposed within the cavity 180 on shafts 190, 192, 194 respectively. The shafts are supported on respective bushing or bearing pairs 196, 198, 200. The bearings are secured to holes in the cover 182 and opposing sidewall of the housing 178 as previously described in FIGS. 2, 3. Pulley 186 is a double pulley keyed to the shaft 192, wherein each pulley is rotatably coupled to pulleys 184 and 188 via respective drive belts 202, 204. Pulleys 184 and 188 are also keyed to their shafts 190, 194, whereby all shafts and pulleys rotate together in a counter-clockwise direction. Thus left hand drills are used as described further below.

Whereas the end of shafts 190 and 194 are sealed at their upper ends via a suitable rubber seal (e.g., seals 79 of FIGS. 2, 3), shaft 192 extends through the cover 182 and bearing 198 and is demountably secured to an internally-threaded hub 206 (similar to previous hub 74), as by means of a set screw 208. Hub 206 provides the means whereby the assembly 176 may be coupled to the power source configurations of FIGS. 1-6. A pair of lugs 210 are secured as by welding or bolts to the cover 182 a distance apart equal to the width of the housings 50, 50a, 50b (FIGS. 1-4). Lugs 210 are of selected dimensions so as to fit snuggly along the sides of the housing (50, 50a, 50b) to prevent the pulley housing 178 from turning relative to the power source configuration. Threading the threaded hub 206 to the output shaft (40) of the power source securely attaches the assembly 176 thereto.

The shafts 190-194 also extend down through lower bearings 196-200 to terminate in drill clamps 212, 214, 216. The clamps have square holes machined therein to receive the square shanks of respective left hand drills 218, 220, 222, which are secured thereto via respective setscrews 224, 226, 228. Left hand drills are used since the shafts 190-194 turn counter-clockwise. By way of example, the drills may be six to eighteen inches long and from $\frac{1}{4}$ to $\frac{1}{2}$ inch in diameter for the usual soil boring operation, but other diameters and lengths of drills may be used.

FIG. 15 illustrates a modification of the hole boring assembly 176 of FIG. 14, wherein assembly 230 employs gear means in place of the pulleys 184-188 and belts 202, 204. Like components are similarly numbered. The gear housing 232 and cover 234 therefor are similar to those components of FIG. 14, but herein include five pairs of bushings or bearings 236-244 mounted within the cover 234 and opposing sidewall of the gear housing 232. The respective pairs of bearings rotatably support shafts 246-254, which in turn are keyed to respective toothed gears 256-264 for rotation therewith.

The drills 218-222 are coupled to respective shafts 246, 250 and 254 in the manner of FIG. 14. The shafts 248, 252 do not extend down through the opposing housing wall, and are used to position idle gears 258, 262 respectively which provide torque transfer from gear 260 to gears 256, 264.

An alternative means is shown for coupling the assembly 230 to a selected power source configuration. A pair of spaced apart spring clips 266 are secured as by bolts, to the cover 234, and are spaced apart a distance equal to the width of the housing 50 of FIG. 2. The clips 266 are of heavy spring steel and include pointed lugs 268 which snap tightly into matching shoulders of two grooves 270 formed in either side of the housing 50 of FIG. 2. The shaft 250 extends through the cover 234 and bearing 240, and is provided with a square shank at the end thereof, which fits snuggly into a square hole 272 machined into an internally threaded hub 274. Thus hub 274 is threaded onto the output shaft (40 of FIG. 2) and slips over the square shank of shaft 250 as the spring clips 266 are snapped into grooves 270 of housing 50. Clips 266 not only prevent rotation of the assembly 230 with respect to the power source configuration, but also securely attach the assembly thereto while allowing rotational drive to the drills.

As may be seen, various modifications may be made to the hole boring assemblies 176, 230 while providing their intended function. Other mechanical means may be used to couple the assembly and/or the rotational drive to the power source. Furthermore, different pluralities of pulleys, gears, and respective shafts may be used, whereby accordingly, clockwise rotation of right hand drills may be used, and/or more or less drills may be employed in an assembly. Thus, for example, the housing and gear train may be deleted and a single drill 220 (corresponding to the guide rod) may be used to bore a single hole in the soil.

I claim:

1. Rotary, hand-held apparatus for selectively working soil, comprising the combination of;
   a frame including, a handle having an upper grip formed in the upper end thereof, a lower end, and a second grip secured to the handle and extending at right angle therefrom a selected distance from the upper grip;
   power means including an electric drill with a clamping chuck, a source of electricity, and a switch for selectively energizing the electric drill;
   clamp means integral with the handle for demountably securing the electric drill to the handle;
   drive train means including a housing secured to the lower end of the handle and including a sealable cover for the housing;
   said drive train means having, a first gear rotatably disposed within the housing, wherein the clamping chuck of the electric drill is demountably secured to the first gear to impart rotation thereto, a second gear of selectively larger diameter meshed for rotation by the first gear within the housing, and an output shaft secured to the second gear for rotation therewith in response to rotation of the electric drill;
   wherein the first and second gears have a gear ratio of the order of 1-to-5;
   a soil working assembly secured to the output shaft for rotation therewith about an axis substantially normal to the soil surface;
   said soil working assembly including, soil engaging tines formed of a flat length of metal to define a support base from which integrally extend the tines to engage the soil, and a guide rod coaxially secured to the output shaft to demountably confine therebetween the support base of the soil engaging tines;
   wherein the end of the guide rod extends beyond the tips of the tines and is formed at a selected angle to define a boring tip; and
   the soil working assembly further includes, a reinforcing ring rigidly secured to the soil engaging tines immediately below the support base to strengthen the assembly against torsional forces produced by contact of the tines with the soil.

2. The apparatus of claim 1 further including, clutch means coupled between the electric drill and the drive train means to selectively control the rotation of the soil working assembly.

3. The apparatus of claim 2 wherein the clutch means comprises a torque release clutch for allowing the soil working assembly to stop suddenly while the electric drill is providing rotation.

4. The apparatus of claim 2 wherein the clutch means comprises a drive clutch to selectively engage and disengage the electric drill from the soil working assembly in response to operator control.

5. The apparatus of claim 1 further including;
   clutch means operatively coupled between the second gear and the output shaft, and adapted to release the torque at such time as the soil working assembly generates greater than a selected torsional force due to binding.

6. The assembly of claim 1 wherein;
   the support base of the soil engaging tines is secured to the guide rod to define the soil working assembly as a single unit;
   said guide rod includes internally threaded hub means;
   said output shaft is threaded at the end thereof; and
   wherein the assembly is secured to the output shaft by threading the hub to the threaded end thereof.

7. A soil working assembly and a torque producing output shaft adapted for rotating said assembly by a power means, said assembly comprising;
   a guide rod demountably secured coaxially to the output shaft for rotation therewith about an axis substantially normal to the soil surface, said guide rod having an internally threaded hub means integral with the mounting end thereof, with the depending end being formed at a selected angle to define a soil boring tip;
   a soil engaging member formed of a flat length of metal to define a support base from which depends at least a pair of tines, each having a tip at the ends thereof, with the guide rod extending axially therebetween beyond the tine tips and rotatable about the same axis;
   wherein the flat tines are disposed with a sharpened leading edge and a trailing edge, the tips of the tines being formed at an angle to their direction of motion with the leading edges being longer than the trailing edges thereof;
   a reinforcing member secured to the pair of tines immediately below the support base to strengthen the assembly against torsional forces produced by contact of the tines with the soil; and
   the assembly further including, said support base having a square hole formed therein, a square shank formed along an end portion of the output shaft, a shoulder formed in the output shaft and terminating the square shank, threads formed along the end of the output shaft, wherein the square hole of the support base fits over the square shank, and the soil engaging member is demountably secured to the output shaft for positive rotation therewith by threading the hub means onto the threaded end of the output shaft to confine the soil engaging member therebetween.

8. The assembly of claim 7 and further including a power means for driving said output shaft wherein;
   said power means includes a slow speed electric drill, and the soil working assembly and output shaft are demountably secured directly to the drill.

9. The assembly of claim 7 further including a power means for driving said output shaft, wherein said power means is manually powered and includes;
   an elongated drive rod of which said output shaft is a part, said drive rod being coaxially coupled to the guide rod and extending therefrom, said drive rod including an off-axis handle; and
   wherein said drive rod and the manual application of a rotational moment to the off-axis handle defines said power means.

10. The assembly of claim 9, wherein said drive rod is bent along an upper portion thereof to define said off-axis handle, wherein the upper end of the drive rod has a rotatable grip secured thereto, and the drive rod is threadably secured to the guide rod while securing thereto the soil engaging member.

11. The assembly of claim 7 further including a power means for driving said output shaft wherein the power means comprises;
   a gas engine coupled to said output shaft by a drive train means to impart rotation thereto;
   clutch means disposed between the gas engine and the drive train means for manually connecting and disconnecting the gas engine and the drive train means.

12. The assembly of claim 7 wherein;
said tines include three depending tines of selected lengths, selectively spaced about the guide rod.

13. The assembly of claim 7 wherein;
said tines include four depending tines of selected lengths, selectively spaced about the guide rod.

14. The assembly of claim 7 wherein;
the soil engaging tines depend from the output shaft essentially parallel to the guide rod.

15. The assembly of claim 7 wherein;
the tines depend from the output shaft at some selected angle with respect to the guide rod.

16. The assembly of claim 7 wherein;
the tines depend radially outward from the guide rod to define a rotary weed-hoeing soil working assembly.

* * * * *